US005674559A

United States Patent [19]

Riemer et al.

[11] Patent Number: 5,674,559

[45] Date of Patent: Oct. 7, 1997

[54] PROCESS FOR THE PREPARATION OF A POLYMER MATRIX WHICH BECOMES CLOUDY AS A FUNCTION OF TEMPERATURE

[75] Inventors: Heinz Riemer, Bottrop; Ludger Bösing, Dorsten; Werner Friedrich, Herten; Thomas Pollok, Garching; Petra Grünberg, Frankfurt, all of Germany

[73] Assignees: Huels AG, Marl; Chemetall GmbH, Frankfurt, both of Germany

[21] Appl. No.: 421,236

[22] Filed: Apr. 13, 1995

[30] Foreign Application Priority Data

Apr. 13, 1994 [DE] Germany .......................... 44 12 588.7

[51] Int. Cl.$^6$ .......................................... B32B 3/00

[52] U.S. Cl. ...................... 427/165; 427/389.7; 156/332; 156/327

[58] Field of Search .................................. 524/457, 757, 524/759, 760, 761, 762, 774; 156/327, 332; 427/165, 389.7

[56] References Cited

U.S. PATENT DOCUMENTS

| | | | |
|---|---|---|---|
| 2,710,274 | 6/1955 | Kuehl | 154/2.77 |
| 3,679,592 | 7/1972 | Schomburg | 252/153 |
| 3,954,691 | 5/1976 | Wolcott, Jr. et al. | 260/33.2 R |
| 4,170,585 | 10/1979 | Motegi et al. | 524/762 |
| 4,749,506 | 6/1988 | Kitahara et al. | 524/762 X |
| 4,769,427 | 9/1988 | Howakowsky et al. | 526/64 |
| 4,810,738 | 3/1989 | Caridi | 524/457 X |
| 4,877,675 | 10/1989 | Falicoff et al. | 427/165 X |
| 5,004,562 | 4/1991 | Kissel | 524/457 X |
| 5,093,396 | 3/1992 | Calhoun et al. | 524/457 X |
| 5,093,411 | 3/1992 | Buter | 524/755 X |
| 5,149,750 | 9/1992 | Niessner et al. | 526/81 |
| 5,447,981 | 9/1995 | Fock et al. | 524/457 X |

FOREIGN PATENT DOCUMENTS

| | | |
|---|---|---|
| 0 263 586 | 4/1988 | European Pat. Off. . |
| 0 311 566 | 4/1989 | European Pat. Off. . |
| 0 376 118 | 7/1990 | European Pat. Off. . |
| 3522078 | 1/1987 | Germany . |

*Primary Examiner*—Judy M. Reddick
*Attorney, Agent, or Firm*—Oblon, Spivak, McClelland, Maier & Neustadt, P.C.

[57] ABSTRACT

The invention relates to a process for the preparation of a gel material which is not free-flowing, is reversibly transparent as a function of temperature and comprises nonionic and/or nonionically acting surfactants as clouding components. The preparation of the gel material can be integrated into the customary production process for laminated glazing in a simple manner and produces frost-stable glazing which can be employed universally indoors and outdoors. When applied, the strength of the system is so high that it is no longer free-flowing at all and bulging of the laminated pane and running-out are therefore no longer possible.

18 Claims, 1 Drawing Sheet

PROCESS FOR THE PREPARATION OF A POLYMER MATRIX WHICH BECOMES CLOUDY AS A FUNCTION OF TEMPERATURE

BACKGROUND OF THE INVENTION

1. Field of the Invention

This invention relates to a process for the preparation of a gel material which is not free-flowing, is reversibly transparent a function of temperature, can be integrated into the customary process used to produce laminated glazing in a simple manner and gives a frost-stable glazing which can be employed universally indoors and outdoors.

The frost-stable glazing of the present invention can be employed in all instances where it is undesirable or even harmful if certain temperatures are exceeded behind glass surfaces, which are transparent per se, under intensive irradiation by, for example, sunlight. Such products include transparent roofs and walls in industrial halls, greenhouses and the like.

2. Discussion of the Background

There have been numerous proposals to meet such requirements by shading systems which operate automatically and reversibly and become active when certain temperature or light intensities are exceeded.

It is thus known, for example, to provide laminated glazing, and in particular double glazing, with temperature-dependent transparency by incorporating films or gels of varying structure into the intermediate space between panes of glass arranged in parallel.

However, the proposed solutions known to date do not meet the above requirement of problem-free integration into the industrial production of laminated glazing. Further, these systems cannot be universally used.

In the development of heat-sensitive systems for the uses mentioned, the phenomenon of the "cloud point" is used in many cases, this occurring for many polymer solutions and nonionic surfactants at characteristic temperatures due to reversible solvating/desolvating processes or "entanglement and disentanglement processes". When the cloud point is reached, light incident on particles having diameters above the wavelength of visible light is reflected or scattered and partly absorbed.

Water-swellable films based on various polymers are described, for example, in German Offenlegungsschrift DE 32 10 378, U.S. Pat. No. 4,409,383 and U.S. Pat. No. 5,147,923. The essential disadvantage of the systems proposed in the abovementioned publications lies in the lack of frost-stability.

The lack of frost stability also limits the usability of systems of polymers and hydrated salts, such as are proposed in the Patent Specifications DBP 11 54 905, DBP 10 12 752 and DBP 953 193.

The gels mentioned in U.S. Pat. No. 2,710,274 also comprise, in addition to glycols for regulation of the cloud point of the aqueous methyl polyvinyl ether solutions, a water content which is too high to allow frost-stable systems The gels thickened with agar-agar furthermore have the disadvantage, especially in the case of perpendicular glazing of large area, of leading to undesirable bulging of double glazing because of gravity, due to their semi-liquid state of aggregation.

Panes which have bulged in this way and have a nonuniform gel layer thickness show optical distortions, especially when looked through, which are unacceptable in glazing for buildings. Furthermore, in the event of fracture of such a pane, the gel will flow out of the defective pane and cause contamination of the building surface which can be eliminated again only with considerable outlay.

Although the gels described above are still free-flowing, they are nevertheless far too viscous for it to be possible for them to be incorporated into the narrow intermediate space between the two glass panes of a laminated pane of glass by the widely used casting resin process, which is described, for example, in GB 2 155 856.

The low-viscosity systems of FR 2 090 036, in which the clouding is achieved by low-concentration solutions of surfactants (various alkyl or alkylphenyl polyglycol ethers) or of ethylene oxide/propylene oxide copolymers in water or butylglycol are indeed suitable for industrial processing by the casting resin process on the basis of their free-flowing properties, but in return have the effect of bulging of the panes even more significantly.

The aqueous formulations have the abovementioned frost-instability as a further disadvantage. Although the gels described in the Patent Specification DE 35 22 078 allow a frost-stable formulation by increasing the content of glycols and alcohols, these gels also have the disadvantages of bulging of double glazing of large area. The high viscosity of the clouding gels described is also to be regarded as a further disadvantage here (see for example, Comparative Example 1), which allows rapid and bubble-free introduction of the gel into the comparatively narrow intermediate spaces of typical double glazing only with a high technical outlay. The maturing time required for the gels of up to 12 hours before use is also a handling disadvantage for an industrial production process.

SUMMARY OF THE INVENTION

Accordingly, one object of the present invention is to provide a process for the preparation of a gel material which is not free-flowing and has a temperature-dependent reversible transparency which can be established over the widest possible temperature range, without the abovementioned disadvantages. It is particularly desirable that the system have the lowest possible viscosity in the processing state, so that it can be processed by the casting resin process. When applied, the strength of the system should be so high that it is no longer free-flowing and bulging within the laminated pane or running out is therefore no longer possible.

Furthermore, the system should be frost-stable and stable to exposure to UV and changes in temperature, and should not lead to problems with the customary sealing materials for multiple glazing in respect of the edge join.

This and other objects are achieved according to the invention by a process in which a clouding system having a frost-stable formulation is initially mixed homogeneously with monomers which can be polymerized in principle. After introduction into the intermediate space between parallel glass sheets, this mixture, which has the lowest possible viscosity, is polymerized. The resulting polymer matrix is no longer free-flowing and forms a clouding system containing a uniformly distributed cloud temperature.

DETAILED DESCRIPTION OF THE PREFERRED EMBODIMENTS

Figure 1:
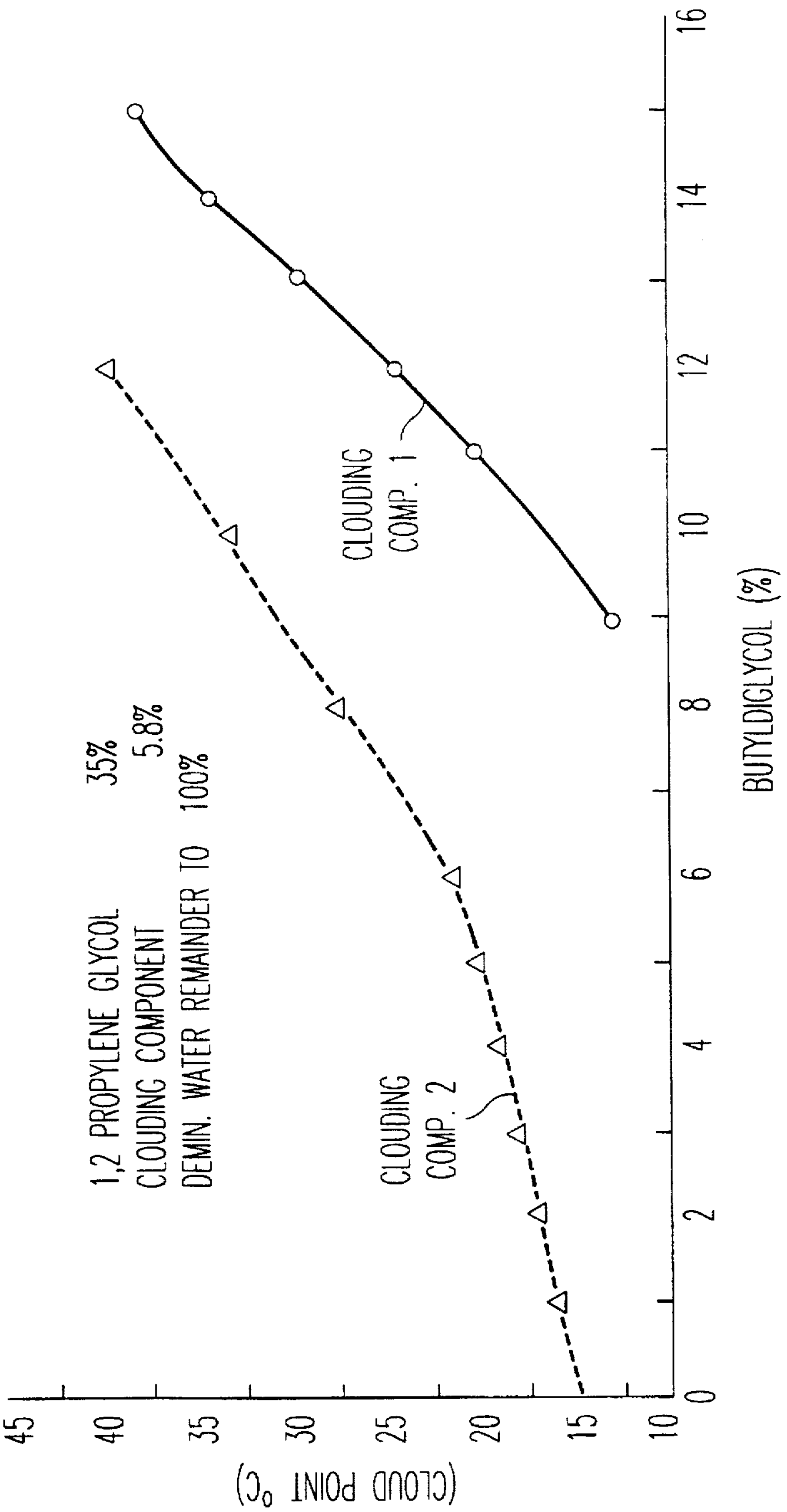
FIG. 1 is a graph depicting the temperature dependence of a clouding system on the content of butyldiglycol. Clouding component 1(●) is an oxoalcohol ($C_{13}$–$C_{15}$) with 5 mol of ethylene oxide and 8 mol of propylene oxide (added in succession). Clouding component 2(°) is a trimethylhexamethylenediamine with 70 mol of propylene oxide and 10 mol of ethylene oxide (added as a mixture).

The present invention provides a gel material which is not free-flowing, is reversibly transparent as a function of temperature and comprises nonionic and/or nonionically acting surfactants as clouding components, frost stabilizers, water and, if appropriate, customary additives.

The present invention also relates to a process for the preparation of such a gel material comprising (i) applying a homogeneous mixture comprising ethylenically unsaturated monomers, nonionic and/or nonionically acting surfactants as clouding components, frost stabilizers, water and, optionally, customary additives, wherein said homogenous mixture is in a low-viscosity state to a mold and (ii) polymerizing said homogenous mixture to form a crosslinked polymer matrix which comprises the other components in uniform distribution.

Any conventional nonionic surfactant can be used in accordance with the present invention. Nonionically acting surfactants which have cloud points in water either themselves or after addition of salts can also be employed.

The frost-stable formulation can be achieved in a simple manner by adding corresponding amounts of lower mono- or polyhydric alcohols, such as ethanol, ethylene glycol, glycerol or 1,2-propylene glycol, or glycol derivatives to the entire system.

Clouding systems which allow the establishment of defined cloud temperatures to be varied over comparatively wide temperature ranges solely by their mixing ratio can be conceived in a simple manner with few basic components via the nature of the surfactants and the amount of antifreeze agents (such as, for example, diethylene glycol monobutyl ether) added. This is illustrated in FIG. 1 by the example of two substances which cloud differently.

When used in practice, i.e. incorporated into a polymerizable system as is described below, it should be taken into account that the cloud temperatures shown in FIG. 1 are shifted. However, although at a different temperature level, the cloud temperatures are virtually linearly dependent on the contents of "frost protection components" and glycol derivatives. The mixing ratios required for the mixtures which the most diverse clouding temperature range can be determined by a few experiments.

Clouding substances

Suitable clouding (or turbidity) substances in accordance with the present invention include substances which have cloud points in the range from 10° to 90° C., preferably from 10° to 70° C., in aqueous mixtures with alcohols and glycol derivatives (as determined in accordance with ISO 1065 or DIN 53917). These include:

a) Optionally etherified fatty alcohol alkoxylates, alkylphenol alkoxylates and alkoxylates of synthetic alcohols (oxo alcohols) of the formula $$R-O-(CH_2-\underset{R_1}{\underset{|}{C}}H-O)_x-(CH_2-\underset{R_2}{\underset{|}{C}}H-O)_y-R_3,$$

wherein R can be a linear or branched alkyl radical having 8 to 18 carbon atoms or an alkylaryl radical having 4 to 18 carbon atoms in the branched or linear alkyl chain and 6 to 12 carbon atoms in the aryl group or a dialkylaryl radical having 8 to 24 carbon atoms in the branched or linear chains and 6 to 12 carbon atoms in the aryl group or an alkylcyclohexyl radical having 4 to 18 carbon atoms in the branched or linear alkyl chain or an arylphenyl radical having 1 to 3 aryl groups with 6 to 12 carbon atoms;

$R_1$ and $R_2$ are hydrogen or $R_1$ is hydrogen and $R_2$ is $—CH_3$ or $R_2$ is H and $R_1$ is $—CH_3$;

$R_3$ can be H or a linear or branched $(C_{1-6})$alkyl group; and x and y are each independently an integer between 0 and 20. The alkoxy groups in this case can be added onto the starting molecule R—OH either in two successive steps or as a mixture.

b) Alkoxylates of naturally occurring fats and oils which have been alkoxylated by customary processes, ethylene oxide and/or propylene oxide being particularly suitable alkoxides and the alkoxylated products containing, according to the invention, between 10 and 70 mol of alkylene oxide per mol of triglyceride.

c) Alkylpolyalkylene glycol esters—also diesters—of fatty acids and dimeric fatty acids having 8 to 36 carbon atoms and 4 to 25 alkylene oxide groups.

d) Alkoxylates of alkyl-mono- and -polycarboxylic acids.

e) Alkoxylates of primary and secondary alkyl-mono- and—polyamines having 2 to 36 carbon atoms in the branched or linear alkyl chain. Reaction products in which the content of ethylene oxide (and/or propylene oxide) is between 20 and 80 percent by weight are particularly suitable.

f) Polyalkylene oxides having molecular weights of 400 to 20,000 g/mol (chiefly 1,000 to 6,000 g/mol), the products in question in the case of copolymers acting both as mixed and as block copolymers.

g) Alkoxylates of fatty acid amides wherein the carbon chain of the carboxylic acids contains 8 to 22 carbon atoms, preferably 12 to 18 carbon atoms, and the amides are prepared by customary processes using primary and secondary alkanolamines, preferably mono- or diethanolamine, and are then alkoxylated with alkylene oxides, preferably ethylene oxide, 1 to 10 mol of alkylene oxide being added on per mol of fatty acid amide.

h) Reaction products of alkyl polyglycol ethers with anhydrides of dicarboxylic acids, in particular maleic anhydride, succinic anhydride, phthalic anhydride and hexahydrophthalic anhydride.

i) Alkyl- and alkylarylpoly(oxyalkylene)-carboxylic acids (ether-carboxylic acids), it being possible for the compounds mentioned under (a) to be employed as starting alkoxylates.

Clouding according to the invention proceeds with all clouding components which have clouding points within the claimed ranges. Thus, the clouding point of the matrix can be varied for a certain component with a certain clouding point by variation of the glycol ratio, if the composition of the acrylic matrix remains constant.

Frost stabilizers

Although a certain frost stability is also possible in principle with additions of salts or of substances which lower the solidification point of water (for example urea), frost stabilities down to −30° C. can be established for the clouding systems according to the invention most easily with alcohols without problems (for example no salting-out of surfactants). However, a combination of alcohols and inorganic salts, such as alkali metal, alkaline earth metal or ammonium salts, is not excluded.

The alcohols according to the invention are chosen from the group consisting of water-soluble mono- and polyvalent alcohols having 1 to 6 OH groups and 1 to 6 carbon atoms, preferably 2 to 4 carbon atoms, and/or from the group consisting of water-soluble alkylglycols having 1 to 4 carbon atoms in the alkyl chain and 1 to 20 alkylene oxide groups, and/or from the group consisting of low molecular weight polyalkylene glycols in the molecular weight range of about 80 to 400 g/mol.

The abovementioned components can be used to establish certain cloud temperatures independently of the particular mixing ratio of the components of the clouding system as explained in FIG. 1.

Additives

Suitable additives in accordance with the present invention include customary UV stabilizers and also inorganic or organic dyestuffs for certain light wavelength ranges, anti-ageing agents, adhesion promoters, such as, for example, functionalized silanes, and pH regulators, such as, for example, sodium hydroxide solution.

Polymer matrix

The clouding systems according to the present invention are mixed homogeneously with crosslinkable monomers, so that after introduction of this homogeneous mixture and subsequent polymerization, the particular clouding system selected is embedded in uniform distribution in a polymer matrix which is no longer free-flowing.

The polymer matrix according to the present invention comprises one or more polymerized monofunctional ethylenically unsaturated monomers and one or more polyfunctional ethylenically unsaturated monomers, the latter responsible for three-dimensional crosslinking. Water-soluble monomers are most suitable. However, monomer mixtures can also comprise water-insoluble monomers in an amount which does not decisively impair the hydrophilic properties of the polymer matrix.

Examples of suitable water-soluble monofunctional monomers include, for example, acrylic acid, methacrylic acid, alkali metal or ammonium salts of acrylic acid or methacrylic acid, hydroxyethyl acrylate, hydroxyethyl methacrylate, hydroxypropyl acrylate, hydroxypropyl methacrylate, acrylamide, methacrylamide, N-alkylacrylamide, N,N-dialkylacrylamide, N-alkylmethacrylamide, N,N-dialkylmethacrylamide, 2-hydroxy-3-methacryloxypropyl-trimethylammonium chloride, 3-methacrylamidopropyltrimethyl-ammonium chloride, 2-acrylamido-2-methylpropane-sulfonic acid, methacryloxyethyl phosphate and N-vinylpyrrolidone.

Examples of suitable polyfunctional monomers include, for example, ethylene glycol diacrylate and dimethacrylate, butanediol diacrylate and dimethacrylate, hexanediol diacrylate and dimethacrylate, diethylene glycol diacrylate and dimethacrylate, triethylene glycol diacrylate and dimethacrylate, tetraethylene glycol diacrylate and dimethacrylate, polyethylene glycol diacrylate and dimethacrylate, dipropylene glycol diacrylate and dimethacrylate, tripropylene glycol diacrylate and dimethacrylate, trimethylolpropane triacrylate and trimethacrylate, glycerol triacrylate and trimethacrylate, pentaerythritol tetraacrylate and tetramethacrylate, acrylic anhydride, methacrylic anhydride, allyl acrylate, allyl methacrylate and N,N-methylenebisacrylamide.

Free radical polymerization

The polymer matrix of the present invention is formed by free radical polymerization of the aqueous solution of the monomers and crosslinking agents in the presence of the clouding system and the frost stabilizers and, if appropriate, the additives. The polymerization is carried out by addition of agents which form free radicals and is initiated by heat, redox initiators or by UV radiation. The agents which form free radicals are preferably likewise water soluble. Examples of agents which form free radicals are peroxodisulphates, cumene hydroperoxide and t-butyl hydroperoxide. Sulphur compounds, such as sodium sulphite, sodium dithionite, sodium disulphite, sodium thiosulphate, sodium hydroxymethyl-sulphinate or formamidinesulphinic acid, can be employed as reducing agents in a redox initiator system. Ascorbic acid or transition metal salts are furthermore also possible reducing agents.

Complete curing is preferably carried out at room temperature without additional supplying of heat. The gelling time here can be varied within wide limits by the combination of peroxide compound and reducing agent or concentration thereof. In the case of UV curing, photoinitiators are added instead of the peroxides. Photoinitiators which can be used are, for example, benzophenone, camphorquinone, α-diketones, thioxanthone derivatives, benzil ketals, benzoin ethers, α-hydroxyacetophenone derivatives and acylphosphine oxides.

The polymer matrix of the present invention is preferrably formed by polymerizing the aqueous solution of the monomers and crosslinking agents in the presence of the clouding system and the frost stabilizers and, if appropriate, the additives inside a laminated pane having an intermediate space between the panes of between 1 to 10 mm, preferably 1–5 mm. The aqueous solution is preferably poured into the intermediate space and the filling opening is then closed. Curing preferrably occurs with the pane in the horizontal position. The amount of time necessary for curing depends on the size of the pane.

This application is based on German patent application P44 12 588.7 filed Apr. 13, 1994; the entire contents of which is herein incorporated by reference.

EXAMPLES

Having generally described this invention, a further understanding can be obtained by reference to certain specific examples which are provided herein for purposes of illustration only and are not intended to be limiting unless otherwise specified.

Example 1

A solution of:

3.9 parts by weight of an adduct of 5 mol of ethylene oxide and 8 mol of propylene oxide (added on in succession) in 1 mol of $C_{13}$–$C_{15}$-oxo alcohol (surfactant 1), 28.5 parts by weight of 1,2-propylene glycol, 10.8 parts by weight of butyldiglycol, 5.0 parts by weight of acrylic acid, 1.5 parts by weight of triethylene glycol diacrylate (TEGDA), 3.4 parts by weight of sodium hydroxide solution (20% strength), and 46.9 parts by weight of demineralized water had a viscosity at 20° C. of less than 20 mpa.s. The complete curing reaction was started by addition of potassium peroxodisulphate and sodium hydroxymethylsulphinate. The mixture was poured into a prepared laminated pane having dimensions of 50 cm×50 cm and an intermediate space between the panes of 2 mm, and, after the filling opening had been closed, was cured completely in the horizontal position.

The completely cured pane had a cloud temperature of 20° C., was frost-stable and showed no differences at all in layer thickness in either the vertical or the horizontal position.

Comparison Example 1

The gel described in Example 1 of DE 35 22 078 had a viscosity at 20° C. of more than 2,000 mpa.s and can be introduced into a laminated pane as in Example 1 only under high pressure and very slowly. In contrast to the pane described in Example 1, such a pane was indeed flat in the horizontal position and shows no differences in layer thickness. In the vertical position, however, the gel sagged under the influence of gravity and caused bulging of the pane. In the upper region, the layer thickness thereby decreased by up to 0.5 mm, while in the lower region it increased by about the same amount.

Example 2

A solution of:

4.3 parts by weight of an adduct of 70 mol of propylene oxide and 10 mol of ethylene oxide (added on as a mixture) in 1 mol of trimethylhexamethylenediamine (surfactant 2), 25.9 parts by weight of 1,2-propylene glycol, 9.8 parts by weight of butyldiglycol, 5.0 parts by weight of acrylic acid, 1.5 parts by weight of TEGDA, 3.9 parts by weight of sodium hydroxide solution (20% strength), 49.6 parts by weight of demineralized water had a viscosity at 20° C. of less than 20 mpa.s.

A pane produced according to Example 1 had a cloud temperature of 41° C., was frost-stable and showed no differences in layer thickness at all in either the vertical or the horizontal position.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the preparation of a gel material which is not free-flowing and is reversibly transparent as a function of temperature, comprising (i) bringing a homogeneous mixture to the site of application in a low-viscosity state and introducing the mixture into a laminated pane with an intermediate space, wherein said homogenous mixture comprises (A) one or more monofunctional ethylenically unsaturated monomers and one or more polyfunctional ethylenically unsaturated monomers, (B) a nonionic and/or nonionically acting surfactant clouding substance that has a cloud point in the range from 10 to 90° C. in an aqueous mixture with an alcohol or glycol derivative, (C) a frost stabilizer, and (D) water; and (ii) polymerizing said homogeneous mixture into a crosslinked polymer matrix with all components in uniform distribution.

2. The process according to claim 1, wherein said homogenous mixture further comprises additives.

3. The process according to claim 1, wherein said clouding substance is an optionally etherified fatty alcohol alkoxylate, alkylphenol alkoxylate or alkoxylate of an oxo alcohols of the formula:

$$R-O-(CH_2-\underset{R_1}{CH}-O)_x-(CH_2-\underset{R_2}{CH}-O)_y-R_3,$$

wherein R is a linear or branched alkyl radical having 8 to 18 carbon atoms, or an alkylaryl radical having 4 to 18 carbon atoms in the branched or linear alkyl chain and 6 to 12 carbon atoms in the aryl group, or a dialkylaryl radical having 8 to 24 carbon atoms in the branched or linear chains and 6 to 12 carbon atoms in the aryl group, or an alkylcyclohexyl radical having 4 to 18 carbon atoms in the branched or linear alkyl chain, or an arylphenyl radical having 1 to 3 aryl groups with 6 to 12 carbon atoms in each group;

$R_1$ and $R_2$ are hydrogen, or $R_1$ is hydrogen and $R_2$ is $-CH_3$, or $R_2$ is H and $R_1$ is $-CH_3$;

$R_3$ is H or a linear or branched ($C_{1-6}$) alkyl group; and x and y are each independently an integer between 0 and 20.

4. The process of claim 1, wherein said clouding substance is an alkoxylate of a naturally occurring fat or oil.

5. The process of claim 4, wherein said alkoxylate of a naturally occurring fat or oil contains between 10 and 70 mol of alkylene oxide per mol of triglyceride.

6. The process of claim 1, wherein said clouding substance is an alkylpolyalkylene glycol ester or diester of a fatty acid or a dimeric fatty acid having 8 to 36 carbon atoms and 4 to 25 alkylene oxide groups.

7. The process of claim 1, wherein said clouding substance is an alkoxylate of an alkyl-mono- or -polycarboxylic acid.

8. The process of claim 1, wherein said clouding substance is an alkoxylate of a primary or secondary alkyl-mono- or -polyamine having 2 to 36 carbon atoms in the branched or linear alkyl chain.

9. The process of claim 1, wherein said clouding substance is a polyalkylene oxide having a molecular weight of 400 to 20,000 g/mol.

10. The process of claim 1, wherein said clouding substance is an alkoxylate of a fatty acid amide wherein the carbon chain of the carboxylic acids contains 8 to 22 carbon atoms.

11. The process of claim 1, wherein said clouding substance is a reaction product of an alkyl polyglycol ether with an anhydride of a dicarboxylic acid.

12. The process of claim 1, wherein said clouding substance is an alkyl- and/or alkylarylpoly(oxyalkylene)-carboxylic acid.

13. The process of claim 1, wherein said polymerizing results in complete curing to give a three-dimensionally crosslinked polymer matrix and is effected by free radical polymerization of ethylenically unsaturated monomers.

14. The process of claim 1, wherein mixtures of mono- and/or polyethylenically unsaturated compounds are employed.

15. The process of claim 1, wherein said nonionic and/or nonionically acting surfactants have cloud points in the range from 10° to 90° C. in aqueous mixtures with mono- and/or polyhydric alcohols and/or alkyl-mono- or -polyglycols.

16. The process of claim 1, wherein the frost stabilizer is selected from the group consisting of mono- and polyhydric alcohols, alkyl-mono- and -polyglycols, alkali metal, alkaline earth metal and ammonium salts, urea, and mixtures thereof.

17. The method of claim 1, wherein the ratio of ethylenically unsaturated monomer to aqueous alcohol solution is 1:500 to 2.3:1.

18. The method of claim 1, wherein the ratio of ethylenically unsaturated monomer to clouding substance is 1.75 to 68.1.

* * * * *